United States Patent [19]
Lantto et al.

[11] Patent Number: 5,850,603
[45] Date of Patent: Dec. 15, 1998

[54] SYSTEM FOR ADDING OR REMOVING SUPPLEMENTARY SERVICES TO A HOME LOCATION REGISTER

[75] Inventors: Jörgen Lantto, Stockholm; Lars Thomas Gunnar Rex, Hägersten, both of Sweden

[73] Assignee: Telefonaktiebolaget LM Ericsson, Stockholm, Sweden

[21] Appl. No.: 722,204

[22] PCT Filed: Apr. 18, 1995

[86] PCT No.: PCT/SE95/00421

§ 371 Date: Oct. 15, 1996

§ 102(e) Date: Oct. 15, 1996

[87] PCT Pub. No.: WO95/28812

PCT Pub. Date: Oct. 26, 1995

[30] Foreign Application Priority Data

Apr. 19, 1994 [SE] Sweden ................................. 9401319

[51] Int. Cl.⁶ ................................................... H04Q 7/38
[52] U.S. Cl. ........................ 455/433; 455/414; 455/418
[58] Field of Search ................................... 455/432, 433, 455/435, 414, 422, 445, 418

[56] References Cited

U.S. PATENT DOCUMENTS

| | | | |
|---|---|---|---|
| 5,142,654 | 8/1992 | Sonberg | 455/433 |
| 5,408,419 | 4/1995 | Wong | 455/433 |
| 5,579,375 | 11/1996 | Ginter | 455/433 |

OTHER PUBLICATIONS

"Architecture of Cellular Networks and Example of Intelligent Networks", Revue HF Tijdschrift, vol. 18, No. 1, pp. 37 to 43 (1994), by Arnoul Vanwelsenaers et al.

Primary Examiner—Edward F. Urban
Attorney, Agent, or Firm—Burns, Doane, Swecker & Mathis, L.L.P.

[57] ABSTRACT

The invention relates to a GSM-type telecommunications system having a superordinate unit or Home Location Register (HLR) which includes software necessary for base functions and relevant supplementary services. The software in the superordinate unit (HLR) is structured such to provide a first software set-up (21) for requisite base functions, a second software set-up (22) for added supplementary services, and a third software set-up (23) for coordinating the first and second software set-ups, so that the third software set-up (23) can be adapted to enable a supplementary service-related portion (22a) of the second software set-up (22) to be included or removed without affecting the first software set-up.

21 Claims, 2 Drawing Sheets

SYSTEM FOR ADDING OR REMOVING SUPPLEMENTARY SERVICES TO A HOME LOCATION REGISTER

TECHNICAL FIELD

The present invention relates generally to a telecommunications system, and then more particularly to a telecommunications system which is adapted to subscriber-related mobile apparatus.

Even more particularly, the invention relates to the provision of improved conditions in digital GSM (Group Special Mobile) systems which when necessary will enable service facilities to be increased or decreased in respect of one or more supplementary services, and also each "new" supplementary service to be added readily to a number of existing services.

It also lies within the scope of the present invention to introduce (and, of course, when necessary to remove a service) a new known supplementary service which has not earlier been used in the telecommunications system concerned and also the introduction of a completely "novel" supplementary service which although not known and applied at the present time can well be required in the future to cover requirements that will then prevail.

DESCRIPTION OF THE BACKGROUND ART

As illustrated in FIG. 1 of the accompanying drawings, a GSM-type digital telecommunications systems, to which the present invention refers, includes a number of mobile subscribers of which one or more of said mobile subscribers or apparatus (MS, Mobile Station) is/are in radio connection with a nearby base station transceiver (BTS) which, in turn, is connected for coaction with a base station controller (BSC).

A base station system (BSS) thus includes in addition to base station transceivers (BTS) for receiving and transmitting radio messages a base station controller which is a node and controls the necessary radio connections.

A base station controller may serve a selected number of transceivers (BTS), each of which, in turn, may serve a number of mobile subscribers (MS). Each station controller (BSC) is connected to a local mobile services switching centre (MSC) which includes a visitor location register (VLR).

The register (VLR) of each switching centre (MSC) coacts with either one or more similar switching centres (MSC/VLR) and one or more superordinate units or home location registers (HLR).

In a GSM system of the aforedescribed kind, each base station system functions, among other things, to handle the radio resources required for setting-up and releasing connections to mobile subscribers (MS) and their associated apparatus located within the area covered by the base station system (BSS).

Since the GSM system is known to the art and is extremely complex, the system will not be described in more detail in this document, although those parts of the system which are included by the invention will be described in more detail.

It can be mentioned, however, that information relating to all and each subscriber, with or without an activated supplementary service, is stored and sorted in the memory of the aforesaid home location register (HLR) and immediately a switching centre (MSC/VLR) indicates through a base station controller belonging to the switching centre that a "new" visitor subscriber (MS) has entered its area, the switching centre (MSC/VLR) requests for a copy of the information concerning this subscriber stored in the home location register (HLR), via its base station system (BSS).

Such a copy is sent over a standard MAP protocol or a special protocol to each switching centre that requests for information, and is stored in the centre in a known manner.

The GSM system also enables respective mobile subscribers to send requisite information and data in the form of subscriber data structured in accordance with a predetermined protocol (different from the MAP protocol) to a nearby receiver/transmitter (BTS) and also to the base station controller coacting with said transceiver (BTS), said controller informing the superordinate switching centre (MSC/VLR) of the wishes of the mobile subscriber.

Certain categories of the transmitted subscriber data are observed and processed in the switching centre (MSC/VLR) while other categories are transmitted directly to the superordinate unit (HLR).

Different procedures may now be followed, of which the following two procedures are mentioned by way of example:

a) When a subscriber arrives in the area covered by a base station system (BSS), the switching centre (MSC/VLR) asks, under certain circumstances, for a copy of the data stored in the superordinate unit (HLR) with respect to the subscriber concerned, so that all relevant subscriber data will be available in the mobile services switching centre (MSC/VLR).

b) When a subscriber requests, by keying in an appropriate code, activation or deactivation, or registering or deregistering of a supplementary service to which the subscriber has subscribed or which has been allocated to the subscriber and the telecommunications system includes the supplementary service requested, this is noted in the mobile services switching centre (MSC/VLR) as coded information which is "irrelevant" to the switching centre and therefore transmits the coded request to the superordinate unit (HLR), in which the necessary change is made in the memory content relating to said subscriber.

A copy of the now corrected information and other information relating to this subscriber is then sent to the switching centre (MSC/VLR).

In order to carry-out the procedure described under b) above, it is necessary for the subscriber to key-in a predetermined code in order to activate or deactivate, or register or deregister, each supplementary service stored and indicated in the superordinate unit (HLR).

The software set-up in the superordinate unit (HLR) of a GSM system of earlier known design is complex by virtue of the base functions required for normal handling of the MAP protocol having beet integrated with the handling of relevant supplementary services.

As a result of this integration, the various software in the superordinate unit, which includes both the base function and relevant supplementary service functions coact with one another in a highly complicated manner.

It is obvious that such integration of functions and software makes each change difficult to carry out, or at least time-consuming.

This problem is expected to be enhanced when endeavouring to create a flexible GSM system, particularly when including and removing one or more supplementary services belonging to the telecommunications system and available for all subscribers or for only those subscribers which require such services.

SUMMARY OF THE INVENTION

When considering the present state of the art as described above, it will be seen that a technical problem resides in realizing the need to arrange the total software set-up of the superordinate unit or Home Location Register (HLR) in separate software sections in a manner which will enable the software to coact for each particular supplementary service and even for each totally "new" supplementary service which is unknown and not applied at present but which may be required to satisfy a future requirement, without needing to restructure the total software set-up.

It will also be seen that a technical problem resides in realizing the significance of creating and introducing in the software of the superordinate unit a general function which will allow known and future supplementary functions and supplementary services to be introduced without affecting the base function and the software for the normal handling of the MAP protocol.

It will also be seen that another technical problem resides in the ability to realize the significance of allowing the total software in a superordinate unit (HLR) to be structured so that a first software set-up is adapted for requisite base functions, a second software set-up is adapted for supplementary services stored in said unit, a third software set-up is adapted for coordinating the first and the second software set-ups, and that the third software set-up can be adapted to enable a supplementary service part of said second software set-up to be introduced or removed without influencing the first software set-up.

The present invention takes as its starting point a GSM system and aims to solve one or more of the aforesaid technical problems by virtue of special software structuring in the superordinate unit (HLR).

Further developments and other applications lying within the scope of the invention are set forth in the following claims.

Those advantages that are primarily afforded by a GSM-type telecommunications system which includes the present invention reside in the creation of conditions whereby the total software of the superordinate unit (HLR) can be structured in separate software set-ups, such that one software set-up will apply to requisite base functions for normal handling of the MAP protocol, while another software set-up will apply to requisite supplementary functions or supplementary services. Furthermore, structuring of a third software set-up is adapted to coordinate the first and the second set-ups of the software. Each part of the second software set-up associated with a supplementary service can be introduced and extracted without needing to influence the first software set-up in the superordinate unit with regard to the base functions for normal handling of the MAP protocol.

BRIEF DESCRIPTION OF THE DRAWINGS

A telecommunications system at present preferred and having characteristic features significant of the present invention will now be described in more detail with reference to the accompanying drawings, in which.

DESCRIPTION OF THE PREFERRED EMBODIMENTS(S)

Figure 1:
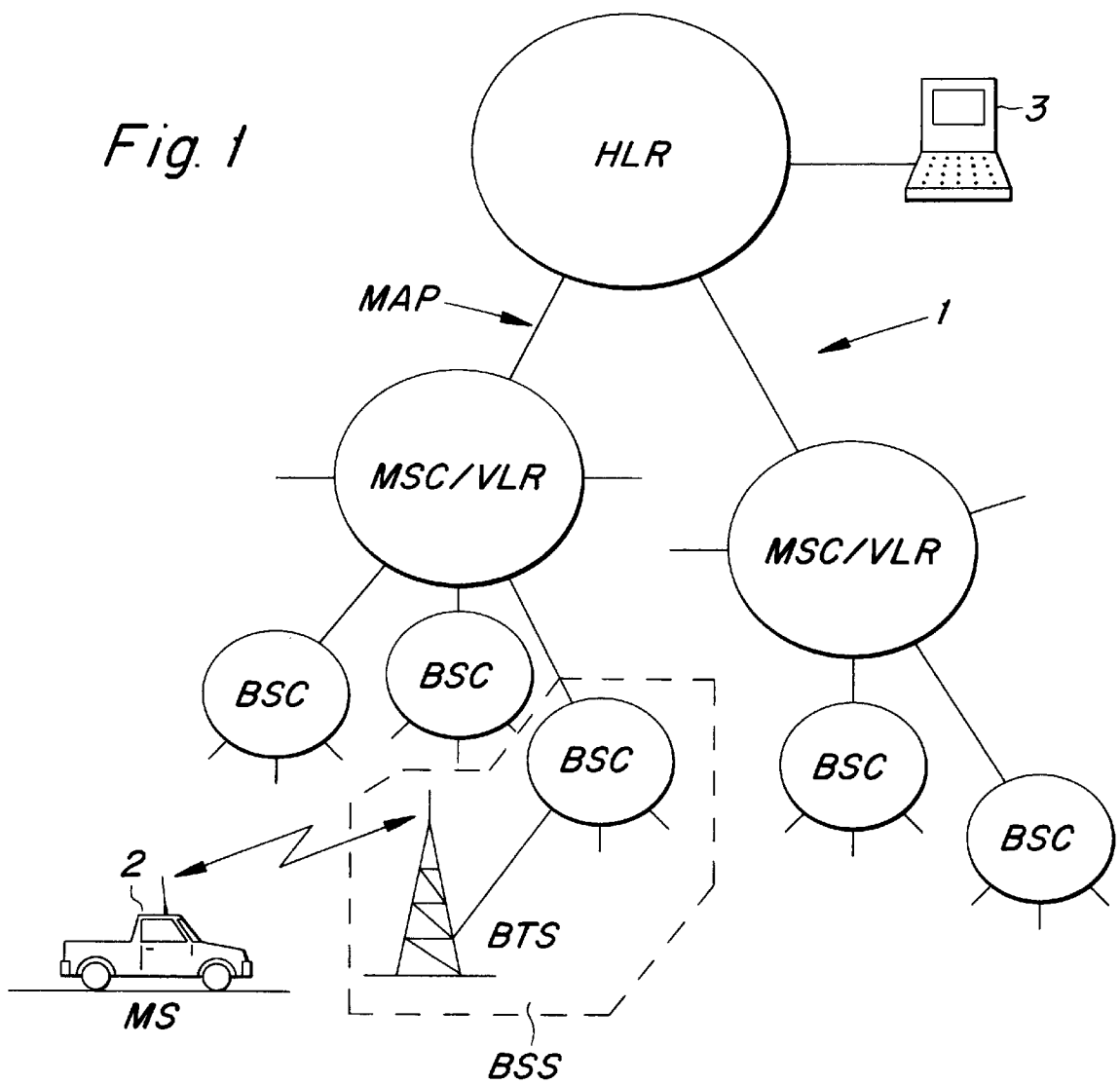
FIG. 1 is a block schematic illustrating the structure of a known GSM telecommunications system adapted for mobile subscribers.

FIG. 1 illustrates schematically a known GSM-type telecommunications system, 1, which may be amended to include the present invention. The illustrated system includes a plurality of mobile subscribers, of which only one, with reference 2 (or MS), is shown in the Figure.

The illustrated telecommunications system has been described in some detail in the introduction.

Each local mobile services switching centre (MSC/VLR), corresponding to the local station in the public switches network, is operative in setting-up calls, billing, coupling services, etc. In addition, the mobile services switching centre (MSC/VLR) of a mobile telephone system is assigned unique functions, such as the exchange of radio stations, subscriber location updating, and so on.

The switching centre with an associated network data base (MSC/VLR) is intended to store data concerning those mobile telephone subscribers who visit temporarily the area covered by the network data base. More specifically the switching centre stores the precise whereabouts or location of the mobile subscribers in the network and stores a copy of the relevant subscriber data which the superordinate unit (HLR) has available for each mobile subscriber.

The superordinate unit or Home Location Register (HLR) is the network data base in which the mobile subscribers have their subscription and permanently stored subscriber data.

In addition to base data, the superordinate unit (HLR) also stores data relating to services, such as supplementary services, and information on the location of each subscriber in the network.

Thus, in the GSM network illustrated in FIG. 1, the requisite data for each subscriber is stored in the superordinate unit (HLR).

Each time a mobile subscriber (MS) is registered as being present in the local switching centre (MSC/VLR) as a new visitor, via the receiver (BTS) and the base controller (BSC), the unit (HLR) asks for a copy of the relevant subscriber data stored therein and relating to the indicated mobile subscriber, and the unit (HLR) sends this copy to the local switching centre (MSC/VLR).

In a GSM system, relevant subscriber data is sent from the unit (HLR) to the switching centre (MSC/VLR) via a CCITT#7 network.

This transmission procedure is described in a MAP protocol (Mobile Application Part, specified ETSI GSM recommendation GSM 09.02).

A system which is as complex as a GSM system includes a very large number of functions and signal transmissions, some of which will be described in more detail below, in addition to some which are needed to obtain an understanding of the present invention.

The MAP protocol used is standardized and affords a definition of a general type of data, called subscriber data.

According to ASN.1 (Abstract Syntax Notation, specified in CCITT X.208/X.209), this data type may include new types of data.

Subscriber data, which is intended for selected supplementary services, is referred to as "Provisioned Supplementary Services" which ark further structured to form an SS-infolist.

Such an SS-infolist may consist in a number of different data types and a particular supplementary service can be identified with the aid of a particular SS-code.

Another supplementary service can be identified with another SS-code and so on.

The SS-infolist may also include one or more supplementary services that can be identified in ways other than through an SS-code.

Figure 3:
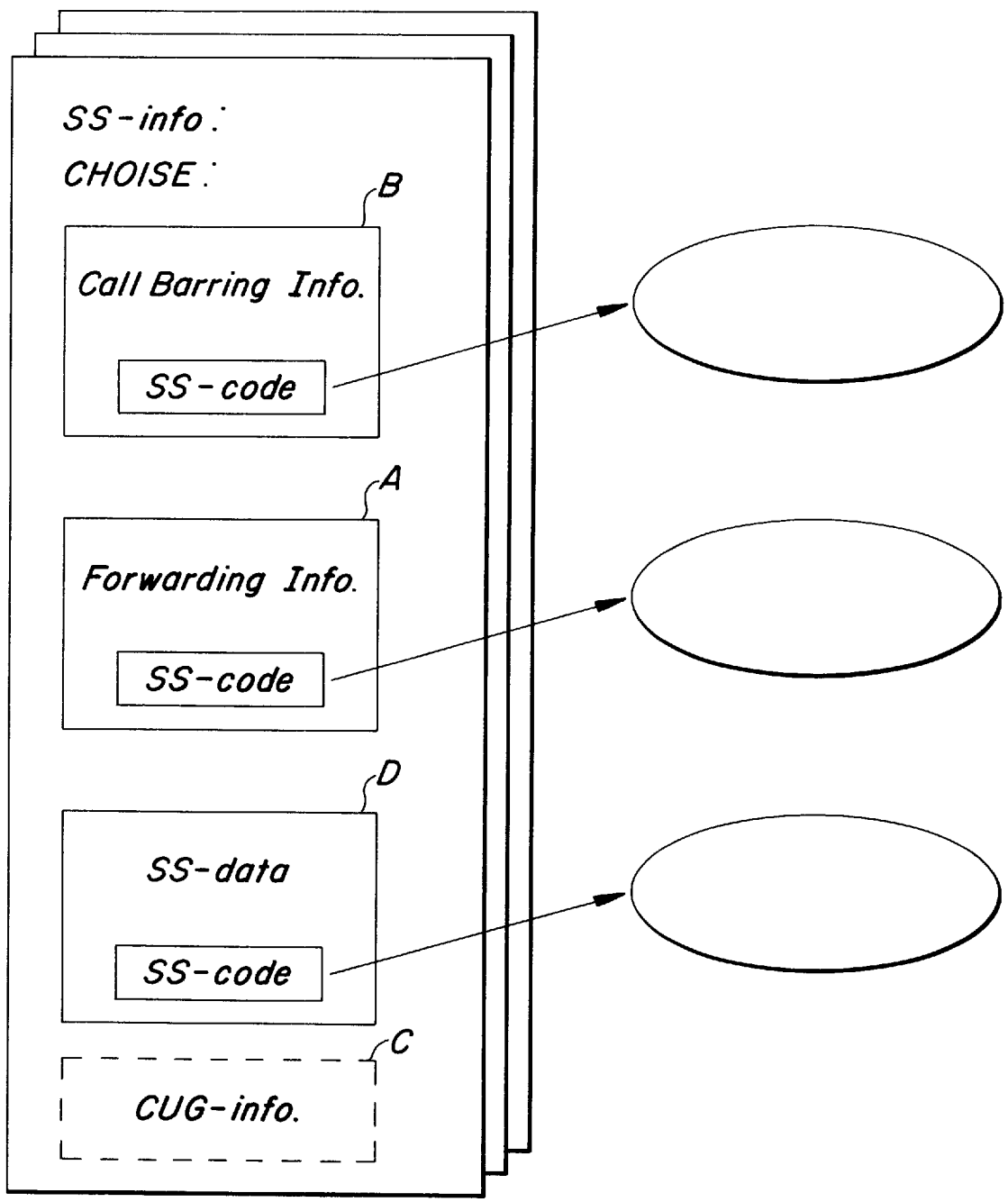
FIG. 3 is intended to illustrate the principle structure of a useful SS-infolist.

FIG. 3 illustrate; an SS-infolist where three supplementary services can be defined by selecting a unique SS-code, and also illustrates a supplementary service that cannot be defined in this way.

Thus, FIG. 3 shows an SS-infolist which provides the possibility of selecting one of the following four services:
A. Forwarding information.
B: Call barring information.
C. Closed used group information.
D. SS-data (Supplementary Services).

The forwarding information A is a type of data which describes the call forwarding or transfer services in a general way, whereas the call barring information B is a data type which describes restricted use services in a general way. The closed used group information describes the more complicated data structure for a closed user group, while SS-data D describes the data structure for remaining supplementary services which do not fall within any of the above-listed categories.

In turn, the data types of all of these different categories include specific data for respective supplementary services.

The internal data type SS-code is a data type which identifies a given supplementary service or a combination of supplementary services.

For instance, when an SS-code represents a first value, the service "Call Forward on Busy" can be pointed out, while a second value will point out the service "Call Forward Unconditional", and a third value may point out the service "All Call Forward Services", and a fourth value may point out the service "All Services".

It shall be possible to identify all supplementary services within a GSM system with the aid of an SS-code. However, the exemplifying embodiment shown in FIG. 3 includes one exception from this rule, namely the supplementary service referred to as closed used group under C above.

This can be summarized by reference to FIG. 3, which shows a sequence of supplementary service data containers, A, B, D which include a MAP protocol. Respective containers A, B, D always contain a parameter indicative of the service or services to which the content of the container relates, together with the data required, this data varying from service to service.

Thus, the parameter defining the intended service is always located in the same place internally within the container, meaning that the data receiver shall be identified in the same manner, irrespective of service.

The proposed solution is based on the necessity of implementing a general function for the software set-up in the superordinate unit HLR and to structure a given total software such that part of the software (a third set-up 23) is able to function as a coordinator between a base-function related software set-up (a first set-up 21) and a supplementary-function related software set-up (a second set-up 22).

In conjunction with updating subscriber data in the mobile services switching centre (MSC/VLR), the third software set-up (23) or the general function is intended to generate an SS-infolist which, is included in the MAP message sent from the superordinate unit (HLR) to said switching centre. This SS-infolist will contain an SS info-parameter (i.e. a container) for each service, which delivers its data to the mobile services switching centre MSC/VLR.

In accordance with the inventive method, respective services require the general function 23 to generate an SS info-parameter with the correct type of container, for instance SS-data. The service then fills this container with the relevant SS-code and optionally also with data concerning this service, in accordance with the structure which is known only in respective supplementary services. This procedure is repeated until all services have written their data in respective containers. When this procedure is complete, the SS-infolist will have been packeted for forwarding to the switching centre within a relevant MAP message.

This general solution to the transmission of subscriber data for supplementary services from the central unit (HLR) enables the base function, which sends subscriber data, to be constructed in a manner which will enable supplementary services to be added incrementally in the unit (HLR) without needing to modify the base function.

This has been found to afford very effective properties in the construction and the programming of supplementary services, which are optional to an operator of the unit (HLR) and can thus be added separately without affecting the base functions in the unit (HLR), in this case with regard to sending subscriber data to the network data base of the switching centre.

Figure 2:
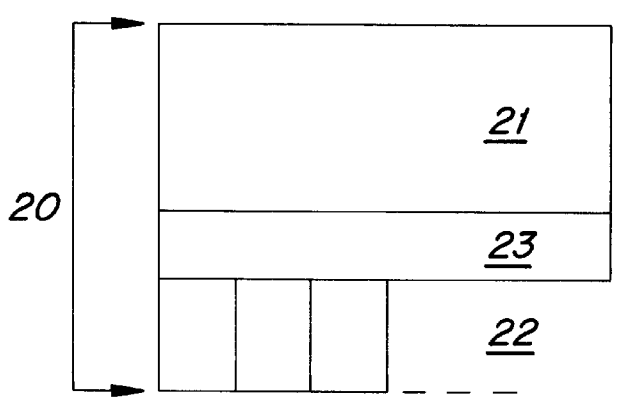
FIG. 2 is intended to illustrate the structuring of relevant software set-ups within the superordinate unit (HLR) in accordance with the invention.

FIG. 2 illustrates structuring of the total software generally applicable to the invention, this software structure being intended for the superordinate unit HLR.

It will be noted that the structuring illustrated in FIG. 2 is schematic and is intended to provide a simple explanation of the basic characteristics of the invention. However, FIG. 2 is sufficiently descriptive for one of normal skill in this field to practice the present invention without work of an inventive nature.

The total software 20 in a superordinate unit (HLR) shall be structured so that a first software set-up 21 is adapted for requisite base functions, a second software set-up 22 is adapted for added supplementary services, and a third software set-up 23 is adapted to coordinate the first and the second software set-ups.

The third software set-up 23 can be adapted to enable a supplementary-service portion 22a of said second software set-up 22 to be either inserted or removed without affecting said first software set-up, wherein the supplementary service can be added to and removed from the HLR unit solely by activation through a terminal 3.

The manner in which the present invention works can be summarized as follows, with reference to the Figures:

1) The invention is based on the assumption that the first software set-up (21) includes the requisite base function software together with the software necessary for normal handling of the MAP protocol;

2) in that the second software set-up (22) contains the requisite software for relevant handling of each available supplementary service and its part of said software set-up; and 3) in that the third software set-up (23) contains the software needed to enable supplementary data to be inserted generally in the MAP message.

4) On the basis of these basic assumptions, the invention provides conditions whereby in conjunction with updating subscriber-relates data in the switching centre (MSC/VLR) with respect to the first software set-up (21), the relevant MAP-messages are generated and all relevant base data is filled in, although not the requisite SS-infolist, wherein control is transferred to the third software set-up (23) or the general function.

5) The general function (23) then generates an SS-infolist, in accordance with FIG. 3.

6) The general function (23) then sends a "broadcast message" informing that a requisite SS-infolist has been generated. This message is received by those supplementary services which wish to forward their data to the mobile services switching centre MSC/VLR.

7) In response to a request from a supplementary service (22), the general function (23) generates an SS info-parameter (a container) of the correct type (e.g. SS-data).

8) The general function (23) gives each supplementary service (22a) access to an empty container.

9) The supplementary service packs the relevant SS-code in the container.

10) The supplementary service (22a) packs relevant data for this service according to the structure that is known only in respective supplementary services.

11) The supplementary service (22a) hands the control of the packaged container to the general function (23).

12) The procedures listed under points 7–11 above are repeated until all supplementary services that wish to pass their data to the switching centre MSC/VLR have packed their respective containers.

13) The supplementary service data in the SS-infolist is now packaged and a control is passed to the first software set-up 21 for forwarding to the switching centre MSC/VLR in a relevant MAP message.

The general function (23) is independent of which supplementary services wish to pass their data to the switching centre MSC/VLR and is not affected by the insertion of new supplementary services or the removal of services.

It will be understood that the invention is not restricted to the aforedescribed and illustrated embodiment thereof and that modifications can be made within the concept of the invention as illustrated in the following claims.

We claim:

1. A GSM-type telecommunications system adapted for mobile subscribers in which the level of services can be increased or reduced by one or more supplementary services, wherein in addition to said mobile subscribers (MS), the GSM system comprises:
    one or more base station systems (BSS) for managing the radio resources needed for setting-up and releasing connections to and from mobile subscribers located in an area covered by respective base station systems, and
    one or more local mobile services switching centers (MSC/VLR) connected to one or more superordinate units (HLR),
    wherein said one or more superordinate units (HLR) include software for providing base functions and relevant supplementary services, and
    wherein the software in a superordinate unit (HLR) is structured to provide
        a first software set-up (21) for providing the necessary base functions;
        a second software set-up (22) for adding supplementary services, and
        a third software set-up (23) for coordinating the first and the second software set-ups and for enabling a part (22a) of said second software set-up (22) belonging to a supplementary service to be added or removed without affecting the first software set-up.

2. A system according to claim 1, wherein the first and the second software set-ups can be mutually coordinated via an adaptation function which is active for all supplementary services and which is included in said third software set-up.

3. A system according to claim 2, wherein each separate supplementary function is able to coact via said adaptation function with requisite base functions included in said first software set-up.

4. A system according to claim 1, wherein each supplementary function included in the second software set-up can be activated, registered, deregistered and deactivated from each mobile subscriber subscribing to a chosen supplementary function, through a keying-in procedure.

5. A system according to claim 1, wherein respective mobile subscribers transmit requisite information relating to activation, deactivation, registration or deregistration of a chosen supplementary service in the form of subscriber data structured in accordance with a predetermined protocol to a nearby connected base station system (BSS), which in turn is connected to a mobile services switching center (MSC/VLR) which sends said subscriber data to the superordinate unit (HLR).

6. A system according to claim 1, wherein with each subscriber query from a mobile services switching center (MSC/VLR), the superordinate unit (HLR) sends requested subscriber-related information, including each allocated supplementary service, to the requesting switching center (MSC/VLR).

7. A system according to claim 6, wherein subscriber data structured within the MAP protocol consists of different types of data for pointing out one or more available supplementary services, such as a call forwarding service, a call barring service, and data structures for other supplementary services, wherein chosen data types for each new supplementary service belong to one of these categories, although with an own code identification.

8. A system according to claim 1, wherein an introduction of an initial function included in a software portion that can be added to said second software set-up with respect to a new supplementary service is effected without influencing any particular base function allocated to the superordinate unit (HLR) and included in the first software set-up.

9. A system according to claim 1 wherein the transmission and reception of information for each unit is structured in accordance with a MAP protocol.

10. A system according to claim 1 wherein requisite subscriber-related information can be transferred from the superordinate unit (HLR) to one of said switching centers (MSC/VLR) via a predetermined protocol, such as a MAP protocol.

11. A system according to claim 10, wherein the protocol is structured to include coordinated data information relating to each selected supplementary service (with the exception of CUG) said coordinated data information is allocated a supplementary service identifying parameter.

12. A system according to claim 1, wherein;
    a) the first software set-up (21) includes requisite base function software and also the software required to enable normal handling of a MAP protocol; and wherein
    b) the second software set-up (22) includes software required for relevant handling of each available supplementary service; and wherein
    c) the third software set-up (23) includes the software required for general insertion of supplementary data into a MAP message.

13. A system according to claim 12, wherein in conjunction with updating subscriber-related data in the switching center (MSC/VLR), the first software set-up (21) generates relevant MAP messages and fills in all relevant base data, with the exception of the requisite SS-infolist, and passes control over to the third software set-up (23) or the general function.

14. A system according to claim 12, where the general function (23) generates an SS-infolist; and in that the general function (23) thereafter sends a broadcast message informing that a requisite SS-infolist has been generated, said message being received by those supplementary services that wish to pass their data to the switching center (MSC/VLR).

15. A system according to claim 12, wherein the general function (23) generates a container of a correct type in response to a request from a supplementary service (22a).

16. A system according to claim 15, wherein the general function (23) provides the supplementary service (22a) with access to an empty container.

17. A system according to claim 16, wherein said supplementary service packs a relevant SS-code in the container.

18. A system according to claim 17, wherein said supplementary service (22a) packs relevant data for said service in accordance with the structure that is known only in respect of supplementary services.

19. A system according to claim 18, wherein the supplementary service (22a) passes control of the packaged container to the general function (23).

20. A system according to claim 19, wherein the procedures set forth in claims 15 to 19 are repeated until all supplementary services that wish to pass their data to the mobile services switching center (MSC/VLR) have packed their respective containers.

21. A system according to claim 20, wherein when packaging of supplementary service data in the SS-code infolist is complete, control is handed over to the first software set-up (21) for forwarding to the switching center (MSC/VLR) in a relevant MAP message.

* * * * *